(12) United States Patent
Nozaki et al.

(10) Patent No.: US 6,513,479 B2
(45) Date of Patent: Feb. 4, 2003

(54) HARNESS STRUCTURE OF ENGINE RELATIVE PARTS

(75) Inventors: Takao Nozaki, Nagoya (JP); Takamichi Miyamukai, Nagoya (JP); Takeharu Ito, Yokkaichi (JP); Kenichi Uchiyama, Yokkaichi (JP)

(73) Assignees: Autonetworks Technologies, Ltd., Nagoya (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/840,090

(22) Filed: Apr. 24, 2001

(65) Prior Publication Data

US 2001/0052334 A1 Dec. 20, 2001

(30) Foreign Application Priority Data

| May 10, 2000 | (JP) | 2000-137097 |
| May 25, 2000 | (JP) | 2000-154618 |
| May 16, 2000 | (JP) | 2000-143471 |
| May 16, 2000 | (JP) | 2000-143760 |

(51) Int. Cl.⁷ ............................................. F02B 77/00
(52) U.S. Cl. .......................... 123/198 E; 123/143 C
(58) Field of Search ........................ 123/198 E, 143 C, 123/195 E, 635, 195 C, 198 R, 184.21, 184.24, 184.34, 184.43, 184.47, 184.61; 174/52.4, 19, 24

(56) References Cited

U.S. PATENT DOCUMENTS

| 5,390,648 A | | 2/1995 | Yanase |
| 5,470,253 A | | 11/1995 | Siems et al. |
| 5,669,367 A | * | 9/1997 | Sawazaki et al. ....... 123/143 C |
| 5,743,235 A | | 4/1998 | Lueder |
| 5,771,850 A | | 6/1998 | Okada |
| 5,996,543 A | * | 12/1999 | Nakayama et al. .... 123/184.21 |
| 6,008,454 A | * | 12/1999 | Kawakita .................... 165/80.3 |
| 6,408,811 B1 | * | 6/2002 | Glovatsky et al. ..... 123/184.61 |

FOREIGN PATENT DOCUMENTS

| JP | U 5-47409 | 6/1993 |
| JP | A 8-210201 | 8/1996 |

* cited by examiner

*Primary Examiner*—Willis R. Wolfe
*Assistant Examiner*—Mahmoud Gimie
(74) *Attorney, Agent, or Firm*—Oliff & Berridge, PLC

(57) ABSTRACT

In a harness structure of engine relative parts, a unit 11 for controlling the engine is installed in an air cleaner 12 located around the engine, and at the same time, circuits 15 are disposed in a casing body 16 of the air cleaner 12 for electrically connecting between the control unit 11 and electrical equipment.

14 Claims, 14 Drawing Sheets

HARNESS STRUCTURE OF ENGINE RELATIVE PARTS

BACKGROUND OF THE INVENTION

1. Technical Field

The present invention relates to a harness structure of engine relative parts.

The present invention relates to a harness structure of engine relative parts in a wire harness of an engine system to be connected to an engine to be incorporated in an engine room of a car.

2. Related Art

FIG. 4 schematically shows a conventional harness structure in an engine room and a neighborhood thereabout. As shown, in the engine room, there are furnished a main harness 101 (shown with a dotted line) forming a main stem within the engine room and an engine harness 103 (shown with a solid line in the same) for connecting engine relative parts.

This harness structure electrically connects, through the engine harness 103, electrical equipment relative with the engine such as an ignition coil, injector, and other several kinds of sensors and a control unit 107 for controlling the engine disposed in a car room.

In regard to such an existing engine harness 103, parts thereof are firstly connected to and mounted on the electrical equipment of the engine side 105 at an engine factory of a carmaker. Under this condition, other parts of the engine harness 103 to be taken out from the engine 105 are temporarily secured to the engine 105 by an auxiliary instrument such as a tape. The engine 105 is transported to a main line of car production and attached to a bar body, thereafter the auxiliary instrument is removed, and the engine is connected to the electrical equipment or the engine control unit 107 disposed in advance to the car body side.

In FIG. 5, numerals 214, 215 designate a junction block or a relay block to which the main wire harness 202 and the engine system wire harness 204 are connected.

[Problems to be Solved]

However, in the conventional harness structure, since the electrical equipment relative to the engine, such as the injector and the engine control unit 107, within the car room, are connected via the engine harness 103, the engine harness 103 has a long length and a heavy weight, so that there occur problems such as that the workability is bad in wiring to the car body and cost. In addition, it is necessary for waterproofing grommets 109 to be furnished to the car body.

In the conventional harness embodiment, the engine system wire harness 204 is gathered into single unit. In an engine factory of a car maker, parts to be connected in correspondence to the engine system wire harness 204 have previously been attached to the ignition coil mounted to the engine 203, and other parts which have been united with auxiliary instruments such as tape or the like, are transported to a car body production line.

In the production line, after attaching the engine 203 to a car main body, tape like auxiliary instruments for uniting the engine system wire harness 204 were taken off, and the wire harness was connected to engine auxiliary parts such as injectors and the emission system parts, and assembled.

However, since the engine system wire harness 204 is gathered into one, total weight goes up, and since connecting parts, as the connectors to the side part or lower parts of the engine 203, are gathered and combined, mounting respective parts was inconvenient.

In particular, as the engine control computer 209 was installed in the car interior 206, attaching grommets 211 for waterproofing or penetrating the dashboard 207 was very troublesome.

SUMMARY OF THE INVENTION

Accordingly, it is an object of the invention to improve set up workability of the engine relative parts and offer a harness structure for the engine relative parts, which may be lightened in weight and lowered in cost.

[Means for Solving the Problems]

A technical instrument for accomplishing the object of the invention is characterized in that a unit for controlling an engine is disposed in an air cleaner installed about the engine, and circuits for electrically connecting between electrical equipment provided in the air cleaner itself or in the neighborhood thereof and the engine control unit, are disposed as one body in a casing body of the air cleaner.

Preferably, the connecting circuits are composed of bus bars or single core leading wires and are buried as one body in the casing body.

It is preferable that the connecting circuits are composed of a flat cable and are fixed as one body following an inside face of the casing body.

Further, it is desirable that the electrical equipment includes at least either of an airflow meter and a throttle sensor.

Further, it is another object of the invention to improve set up workability of the engine relative parts, and offer such a harness structure of the engine relative parts, which may be lightened in weight and lowered in cost.

With respect to the technical means for solving the above mentioned problems concerning the harness structure of engine relative parts, wherein the engine system wire harness is connected to an ignition system such as ignition coils and injectors, to an emission system such as a warm water sensor and $O_2$ sensor, as well as to an engine control computer, a technical solution is present in that the engine control computer is furnished to the engine side, the engine system wire harness is furnished in an embodiment separating the ignition system harness form to be connected to the ignition system and the emission system harness form to be connected to the emission system, and the ignition system harness form is furnished to the engine for providing modularization.

It is also sufficient that the engine system wire harness is furnished in an embodiment where a harness form for electric supply is further separated.

For solving the above mentioned problems, with respect to a harness structure of engine relative parts according to the invention, a unit case body is made by unifying an engine head cover in an air cleaner case, while a control unit for controlling an engine is disposed as one body within the air cleaner case, and a connecting circuit is disposed within the unit case body, such that it passes through at least the engine head cover, the circuit electrically connecting between the engine head cover itself or electrical equipment and the control unit.

In this case, according to the invention, the connecting circuit is composed of bus bars or single core leading wires and buried as one body in the engine head cover. Otherwise, according to the invention, the connecting circuit is composed of a flat cable and fixed following the inside surface of the engine head cover.

Further, according to the invention, as the electrical equipment, may be at least one of ignition coils or injectors.

In addition, according to the invention, an airflow meter and a throttle sensor are disposed in the air cleaner case, and the circuit electrically connecting between the control unit, the airflow meter and the throttle sensor is disposed as one body in the air cleaner.

A technical instrument for accomplishing the object of the invention is preferable in that a control unit for controlling an engine is located to an intake manifold, and connecting circuits for making an electric connection between electrical equipment disposed in the neighborhood of the intake manifold and the engine control unit are integrally furnished with the intake manifold.

Preferably, the electrical equipment includes at least injectors; the connecting circuits are connected to each other and furnished with a first circuit portion and a second circuit portion; the first circuit portion is disposed to a trunk connecting part which is integrally attached to the intake manifold, while the second circuit portion is disposed to wiring parts for connecting the injectors which are integrally provided to the intake manifold; the engine control unit is furnished with a first connector for connecting the trunk connecting part; the trunk connecting part is equipped with a second and a third connectors which are electrically connected each other through the first circuit portion, the second connector being mounted to the first connector, enabling an electric connection, and the third connector being served for electric connection with the wiring part for connecting the injectors; the wiring part for connecting the injectors is equipped with fourth and fifth connectors which are electrically connected to each other through the second circuit portion, the fourth connector being mounted to the third connector, enabling an electric connection, and the fifth connector being served for electric connection with the injectors.

Preferably, the engine control unit is fixedly provided to the intake manifold, and with respect to the first connector and the second connector, and the third connector and the fourth connector, at least either connector couple are equipped with a locking structure for locking both connectors in such a manner that both connectors are mutually engaged together with mutual mounting thereof; and the trunk connecting part is integrally fixed to the intake manifold via the engine control unit and the wiring part for connecting the injectors together with the mounting and connecting between the first and the second connectors, and the third and the fourth connectors.

Further preferably, the first circuit portion is composed of bus bars or single core leading wires.

Still further preferably, the second circuit portion is composed of the bus bars, the single core leading wires or flat cables.

Yet further preferably, the trunk connecting part is provided with a sixth connector to be connected to the wiring part for connecting the ignition coil to be provided to the engine or in the neighborhood thereof, and at the same time provided with a third circuit portion, and the wiring part for connecting the ignition coil is enabled to be connected with the engine control unit via the sixth connector, the third circuit portion and second connector.

DETAILED DESCRIPTION OF THE PREFERRED EMBODIMENTS

[Mode for Carrying out the Invention]
(First Embodiment)

Figure 1:
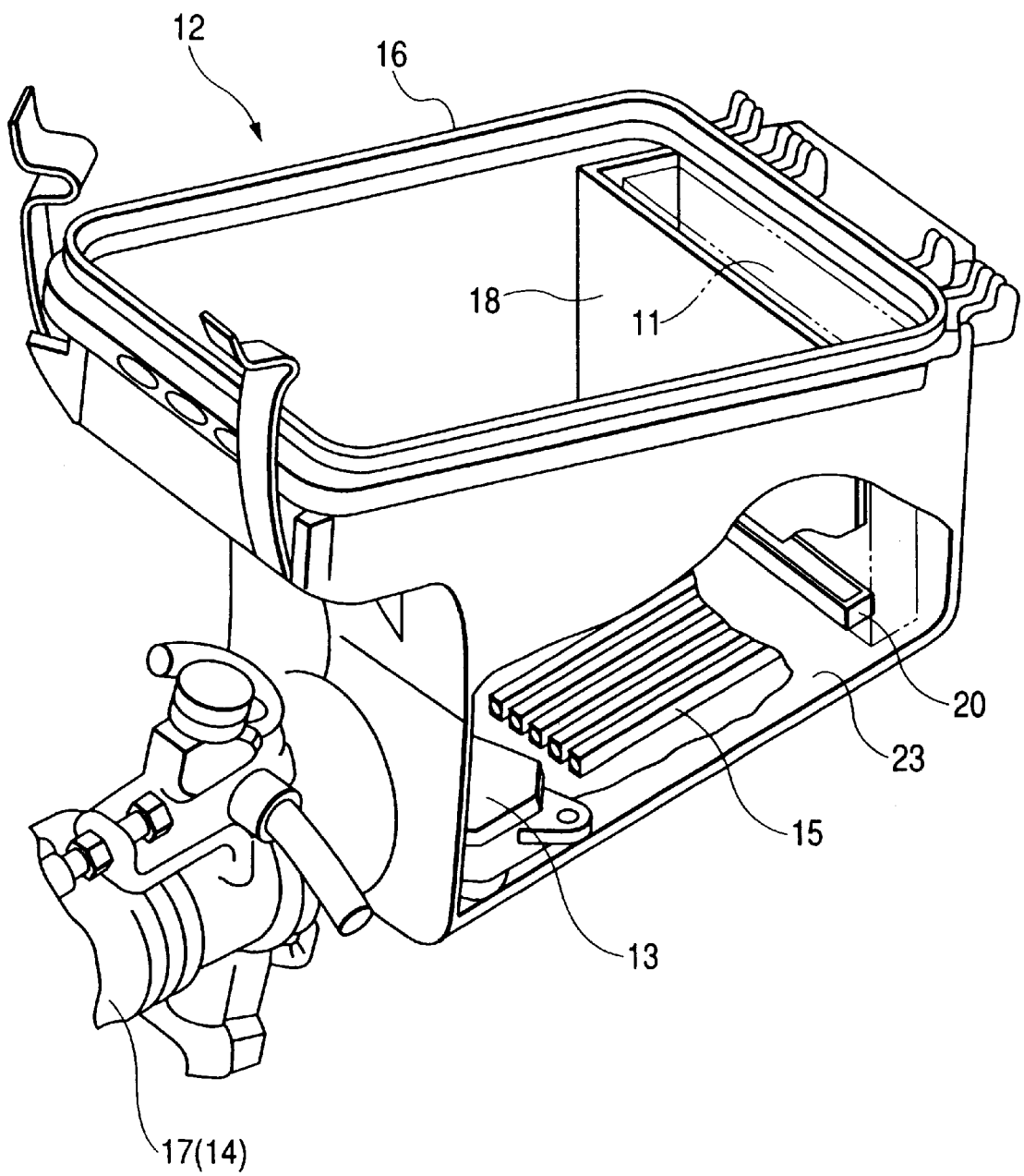
FIG. 1 is a perspective view showing the air cleaner to which the harness structure of the engine relative parts according to the embodiment of the invention is applied.
Figure 2:
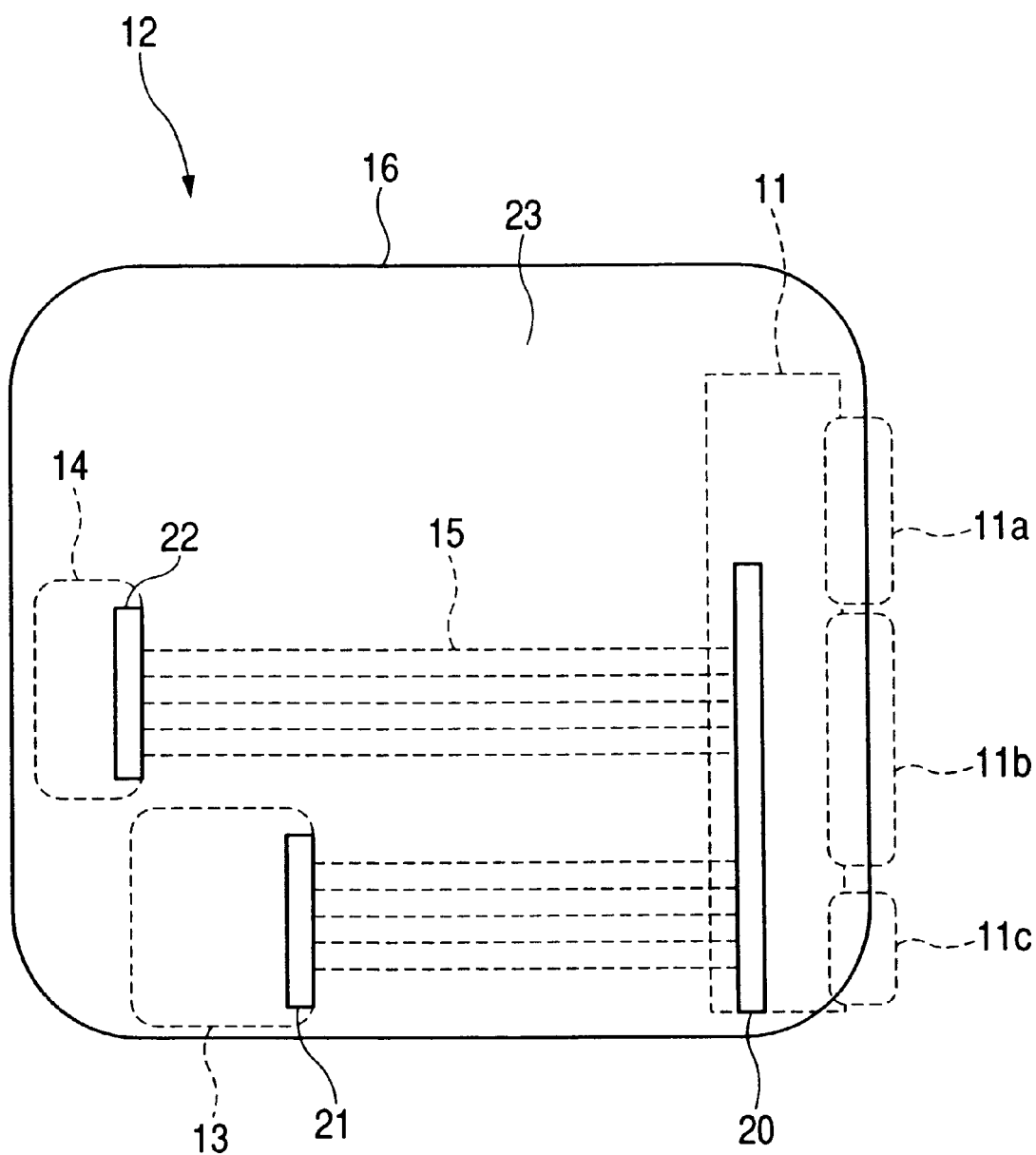
FIG. 2 is a view schematically showing the plane structure of the air cleaner of FIG. 1.

FIG. 1 is a perspective view, partially in section, showing the air cleaner to which the harness structure of the engine relative parts according to an embodiment of the invention is applied, and FIG. 2 is a view schematically showing the plane structure of the air cleaner of FIG. 1. The air cleaner to which the present embodiment is applied is based on a premise that it is installed about the engine.

In the harness structure of the engine relative parts, as seen in FIGS. 1 and 2, the unit 11 for controlling the engine (for example, EFI-ECU) is installed in the air cleaner 12 to be placed around the engine, and the circuits for electrically connecting between the electrical equipment (herein, the airflow meter 13 and the throttle sensor 14) provided in the air cleaner itself 12 or in the neighborhood thereof and the engine control unit 11, are disposed as one body in the casing body 16 of the air cleaner 12.

The casing body 16 is composed enabling to support a filter (not shown) at the upper opening thereof, and a cover part (not shown) is provided to close the upper opening disposed with the filter. When an air introduced from an outside through an air-leading path at the cover side passes through the filter in the casing body 16, foreign particles contained in the air are removed. The cleansed air is supplied to the respective combustion chambers through the airflow meter 13, the throttle body 17 and an intake manifold.

At one side in the casing body 16, a partition wall part 18 is provided for forming a space housing the control unit 11 in relation with an inside wall of the casing body 16, while on the bottom of the casing body 16 in the housing space, a waterproof connector 20 is provided enabling connection with a connector (not shown) of the control unit 11. Further, on the bottom of the casing body 16, there are provided a waterproof connector 21 enabling connection with a connector (not shown) of the airflow meter side 13 and a waterproof connector 22 enabling connection with a connector (not shown) of the throttle sensor side 14.

In response thereto, the connecting circuits 15 are buried as one body in a bottom wall 23 of the casing body 16 so as to be electrically connecting between the waterproofing connectors 20, 21 and 22. In this embodiment, the connecting circuits 15 are composed of plural bus bars or single core leading wires buried in the bottom wall 23, and via the connecting circuits 15, the control unit 11, the airflow meter 13 and the throttle sensor 14 are connected.

The control unit 11 is furnished with a waterproofing connector (not shown) for connecting to the waterproofing connector 20, and connectors 11, 11b, 11c for connecting an electric source system and other electrical equipment.

As mentioned above, according to the present embodiment, the unit 11 for controlling the engine is installed in the air cleaner 12 located around the engine, and at the same time, the circuits 15 are disposed in the casing body 16 of the air cleaner 12 for electrically connecting between the control unit 11 and the electrical equipment (herein, the airflow meter 13 and the throttle sensor 14) disposed in the air cleaner itself 12 or in the neighborhood thereof, so that it is possible to omit a harness between the airflow meter 13, the throttle sensor 14 and the control unit 11, and troublesome assembling work thereby, and as a result, it is possible to improve set up workability of the engine relative parts and reduce weight and lower cost.

Further, the connecting circuits 15 are buried in the bottom wall 23 of the casing body 16 of the air cleaner 12, so that an outward appearance about the circumference (in particular, the air cleaner 12) of the engine part is improved, and the circuit 15 is less likely to be damaged, thereby heightening the reliability of the electric connection.

As the control unit 11 is furnished in the casing body 16 of the air cleaner 12, the control unit 11 can be protected by the casing body 16.

Figure 4:
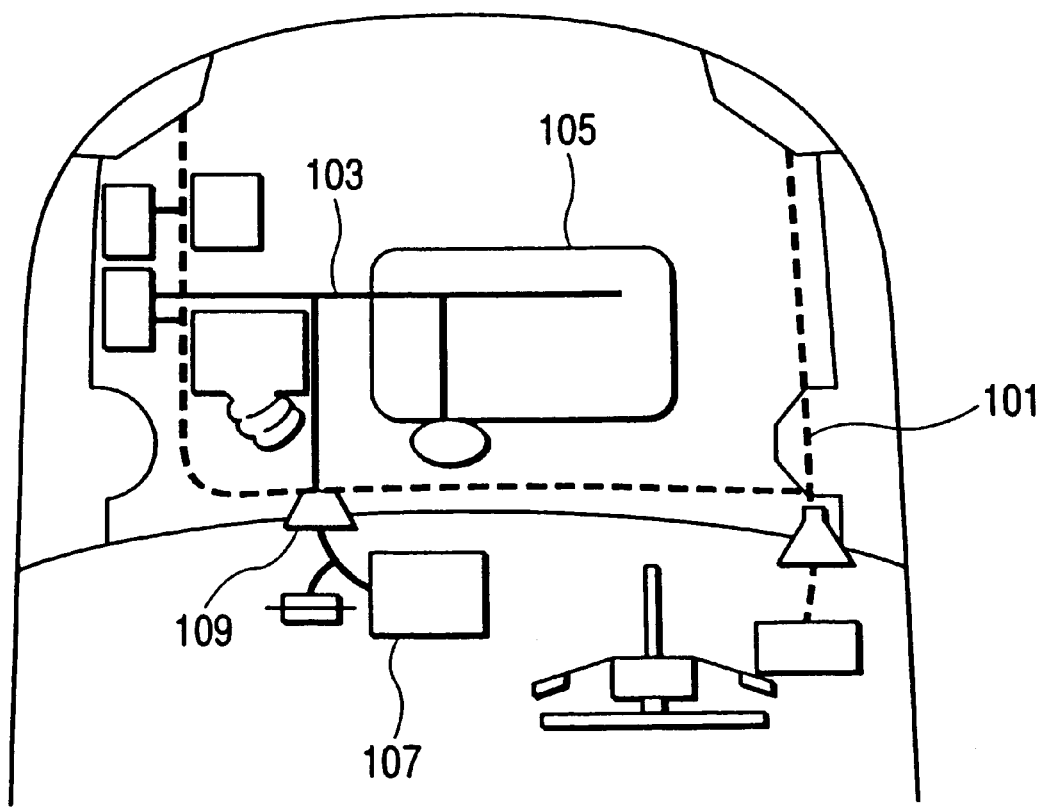
FIG. 4 is a view schematically showing a conventional harness structure at the engine room and in the neighborhood thereof.

As the control unit 11 is disposed in the air cleaner 12, it is possible to shorten the length of the harness for connecting the control unit 11 and the electrical equipment to the car body side, reduce weight, lower cost, and to obviate the need for grommet 109 shown in FIG. 4. Thus the setting work to the car body can be simplified.

(Second Embodiment)

Figure 3:
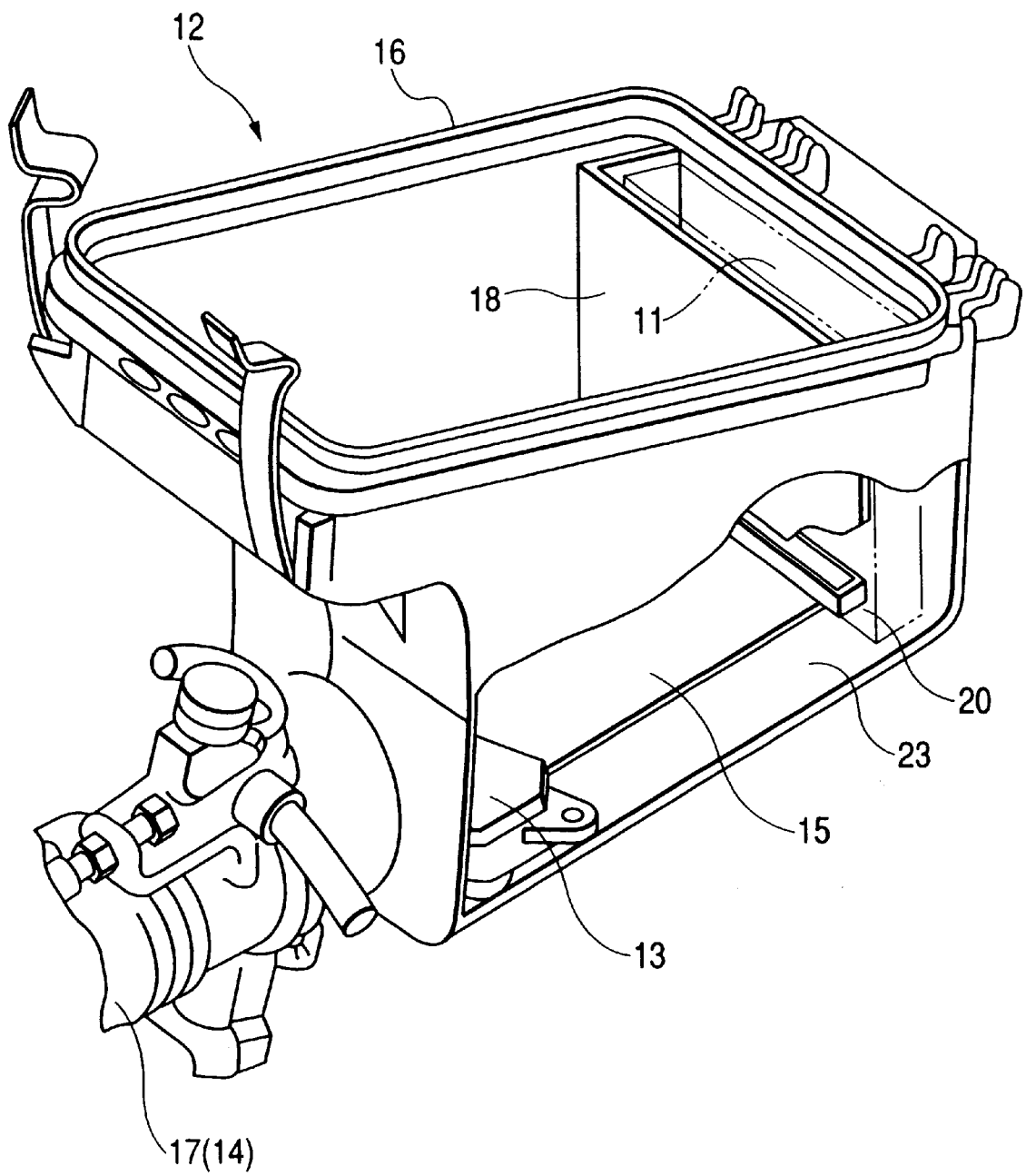
FIG. 3 is a perspective view showing the structure of the air cleaner to which the harness structure of the engine relative parts according to the second embodiment of the invention is applied.

FIG. 3 is a perspective view, partially in section, showing the structure of the air cleaner to which the harness structure of the engine relative parts according to a second embodiment of the invention is applied. The connecting circuit 15 is the only substantial difference between the harness structure of the present embodiment and the harness structure according to the first embodiment. Mutually corresponding parts will be given the same reference numerals for omitting explanations therefor.

In the present embodiment, as seen in FIG. 3, the connecting circuits 15 are composed of a flat cable, and fixed with a bonding agent, following the bottom interior of the case body 16.

Also this embodiment can bring about similar effects to those of the first embodiment.

In each of the embodiments, still other electric equipment such as junction connectors, noise filters and others may be added to the electric equipment to be provided in the air cleaner itself or in the vicinity thereof.

[Effects of the Invention]

According to the first to fourth aspects of the invention, the unit for controlling the engine is disposed in the air cleaner around the engine, the unit for controlling the engine is installed in the air cleaner located around the engine, and at the same time, the circuits are disposed in the casing body of the air cleaner for electrically connecting between the control unit and the electrical equipment disposed in the air cleaner itself 12 or in the neighborhood thereof, so that it is possible to omit a harness between the airflow meter 13, the throttle sensor 14 and the control unit 11, and save troublesome assembling work, and as a result, it is possible to improve set up workability of the engine relative parts and reduce weight and lower cost.

[Mode for Carrying out the Invention]

(Third Embodiment)

Explanation will be made to a third embodiment of the invention. In the following explanation, in regard to the same composing elements as those of the conventional structure, the same reference numerals and signs will be given to omit explanation thereof.

Figure 5:
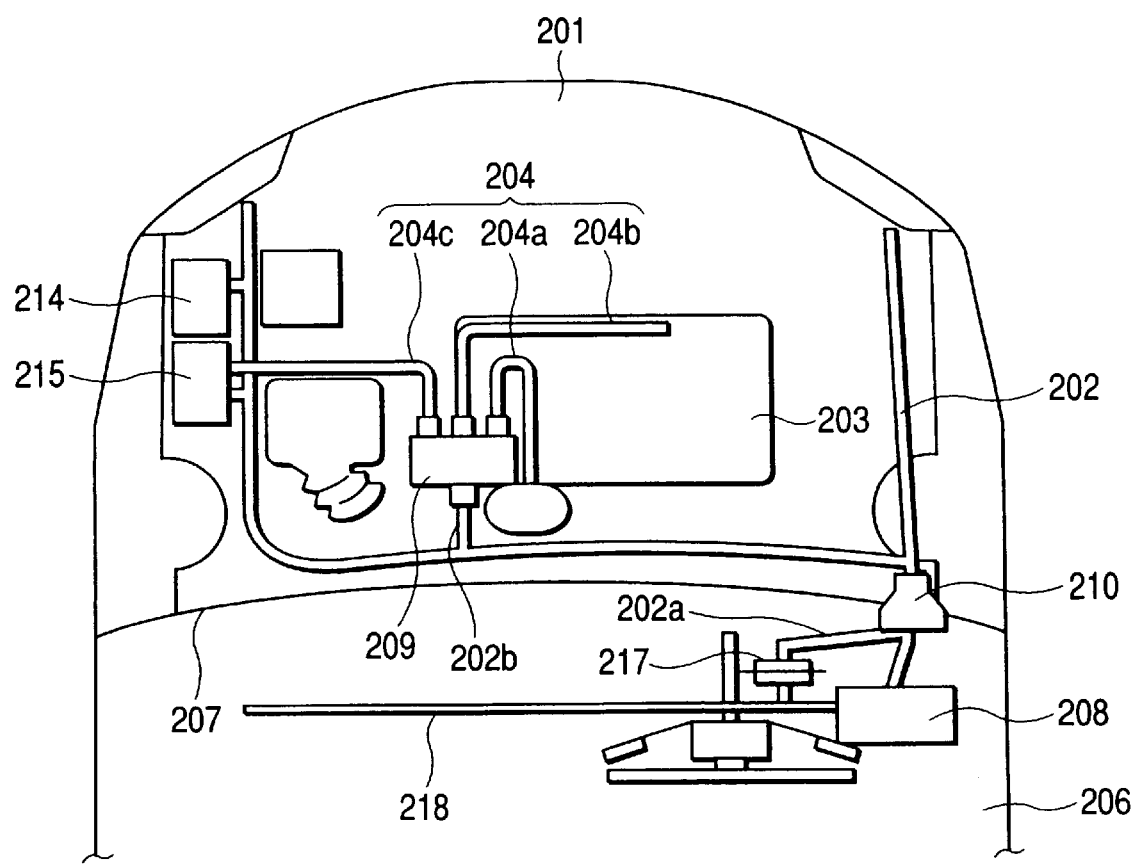
FIG. 5 is an outlined view of wiring the wire harness according to the third embodiment of the invention.

As seen in FIG. 5, the main wire harness 202 and the wire harness for the interpanel wire are arranged conventionally.

The engine control computer 209 is attached to the engine side 203, for example, on the engine head cover.

The engine system wire harness 204 is divided into the ignition system harness 204a, the emission system harness 204b and the electric supplying harness 204c.

This embodiment is structured where the ignition system harness 204a is connected, via connectors, to the ignition system parts relative to control of the engine 203 including the ignition coils, injectors, airflow meter, throttle position sensor, and at the same time it is connected, via connector, to the engine control computer 209.

The emission system harness 204b is mainly connected, via connectors, to the emission system parts relative to control of exhausted gas, such as a warm water sensor, $O_2$ sensor, knock sensor, composition sensor, crank position sensor, VSV (evaporator exit sensor), ISCV, VVT solenoid, power steering oil pressure sensor, input shaft rotating sensor, ECT solenoid, and at the same time it is connected, via connector, to the engine control computer 209.

The electric supplying harness 204c is connected to an electric source system such as a junction block 215 and battery, and at the same time it is connected, via connector, to the engine control computer 209.

In the present embodiment, a circuit is installed within the engine control computer 209, so as to connect the ignition system harness 204a, the emission system harness 204b and the electric supplying harness 204c.

A diverging point 202a of the main wire harness 202 in the car interior 206 is connected, via a connector 217, to the wire harness 213 for the interpanel wire, while a diverging point 202b of the main wire harness 202 in the engine room 201 is connected, via connector, to the engine control computer 209.

This embodiment is composed as mentioned above, and as the engine system wire harness 204 is divided into the ignition system harness 204a, the emission system harness 204b and the electric supplying harness 204c, parts to be connected in correspondence to the ignition system harness 204a which are previously connected to the ignition coils attached to the engine 203 in an engine factory of a car maker, are modularized, and other parts which have been united with auxiliary instruments such as tape or the like as mentioned above, are transported to the car body production line together with other emission system harness 204b and the electric supplying harness 204c.

In the production line, after attaching the engine 203 to a car main body, tape like auxiliary instruments for uniting the ignition system harness 204a are taken off, and the engine system wire harness 204 is connected to the ignition system parts relative with control of the engine 203 of other injectors, and at the same time it is connected to the engine control computer 209 attached to the engine head cover.

The emission system harness 204b is connected to the emission system parts such as the warm water sensors respectively disposed around the engine 203, and around upper parts, side parts and lower parts of the engine auxiliary parts, and it is connected to the engine control computer 209.

The electric supply harness 204c is connected to the junction block 215, and to the engine control computer 209.

The diverging part 202b of the main wire harness 202 is connected to the engine control computer 209. Thus, the assembling work of the engine system wire harness 204 is accomplished.

As mentioned above, the embodiment is structured where the engine control computer 209 is attached to the engine side 203 within the engine room 201, so that the setting-up workability is heightened by the engine system wire harness 204 without requiring to attach grommets or penetrate the dashboard which were conventionally troublesome and difficult works.

As the engine control computer 209 is equipped in the neighborhood of the engine 203, the connecting length thereof can be shortened than the harness length of the respective harnesses 204a, 204b, 204c, and the weight as a whole of the engine system wire harness 204 can be reduced and the production cost can be lowered.

As the engine system wire harness 204 is divided into three of the ignition system harness 204a, the emission system harness 204b and the electric supplying harness 204c, the respective harnesses 204a, 204b, 204c can be easily handled. Besides, the ignition system harness 204a is connected to the engine side 203 and modularized. After the engine 203 is attached to the car main body, the emission system harness 204b and the electric supplying harness 204c can be attached without intercept of the ignition system harness 204a, and also in this regard, the assembling can be easily carried out.

The emission system harness 204b easily effected with noise is separated at once, so that noises can be prevented from occurring.

The embodiment is structured where the circuit is installed within the engine control computer 209, so as to connect the ignition system harness 204a, the emission system harness 204b and the electric supplying harness 204c, so that the structures of the respective harnesses can be further simplified, and also in this regard, the assembling can be easily carried out.

(Fourth Embodiment)

Figure 6:
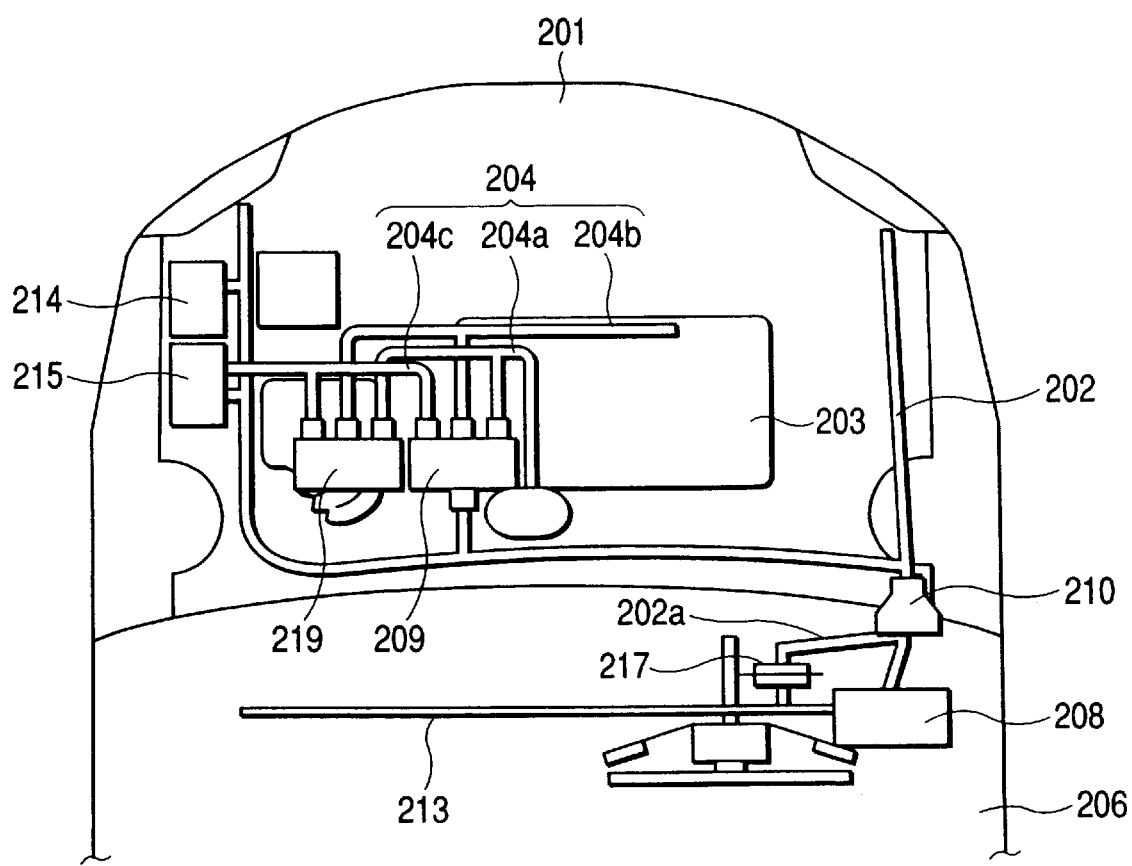
FIG. 6 is an outlined view of wiring the wire harness according to the forth embodiment of the invention.
Figure 7:
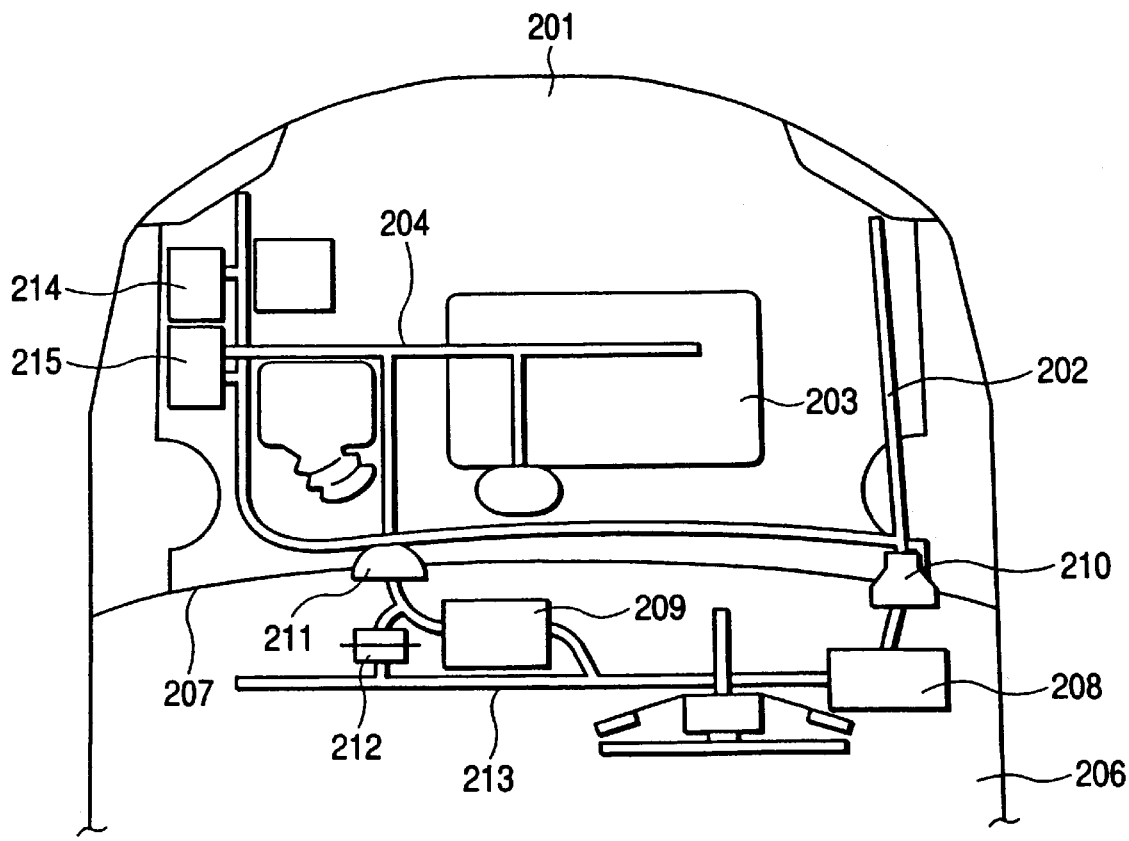
FIG. 7 is an outlined view of wiring the wire harness showing the prior art example.

FIG. 6 shows a fourth embodiment, and in the following explanation, in regard to the same composing elements as those of the third embodiment, the same reference numerals and signs will be given to omit explanation thereof.

This embodiment is structured where a circuit is installed within the junction block 219 provided in the neighborhood of the engine control computer 209 so as to connect the ignition system harness 204a, the emission system harness 204b and the electric supplying harness 204c.

There are accordingly diverging parts connected, via connectors, to the junction block 219 respectively connecting the ignition system harness 204a, the emission system harness 204b and the electric supplying harness 204c.

Also depending on the present embodiment, as by the third embodiment, it is possible to heighten the set up workability, reduce the weight, and lower the production cost.

Each of the above mentioned embodiments discloses the harness structure where the engine system wire harness 204 is diverged into three of the ignition system harness 204a, the emission system harness 204b and the electric supplying harness 204c, and when supplying the electric source from the main wire harness side 202, the electric supplying harness 204c is no longer necessary, the setting-up workability of the engine system wire harness 204 is more heightened and the weight can be lightened.

The embodiment shows the structure where the engine control computer 209 is installed on the engine head cover, and it may also be installed within the engine head cover, and further such structures are sufficient that the engine control computer is installed as one body in an intake manifold to be attached to the engine 203 or in auxiliary parts of the air cleaner provided in the vicinity of the engine, and that the engine control computer 209 in the neighborhood around circumference of these auxiliary parts.

[Effects of the Invention]

As mentioned above, according to the fifth and sixth aspects the harness structure of the invention, the engine control computer is attached to the engine side, and the engine system wire harness is provided in such an embodiment dividing into a form of the ignition system harness connected to the ignition system and a form of the emission system harness connected to the emission system, and the ignition system harness embodiment is attached to the engine for providing modularization. Thus, it is possible to improve the set up workability, reduce the weight and lower the production cost.

If providing such a structure that the engine system wire harness is an embodiment where the electric supplying harness is further separated, the handling of each of the respective harnesses is made easier, and also in this regard, the improvement of setting up the parts can be attained.

[Mode for Carrying out the Invention]

(Fifth Embodiment)

Reference will be made to the harness structure of the engine relative parts according to a fifth embodiment of the invention.

Figure 8:
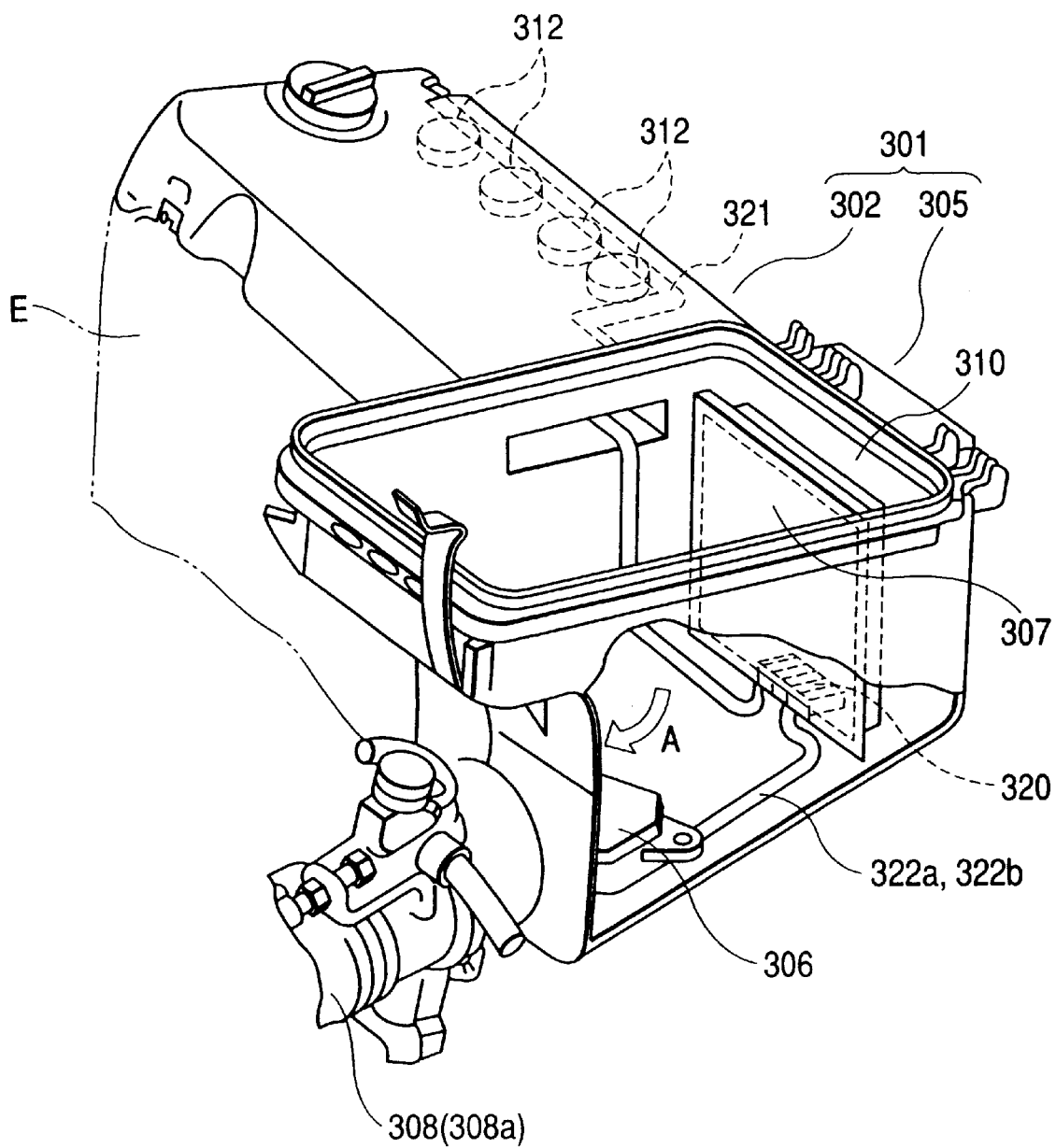
FIG. 8 is a perspective view, partially in section, showing the harness structure of the engine relative parts according to the fifth embodiment of the invention.
Figure 9:
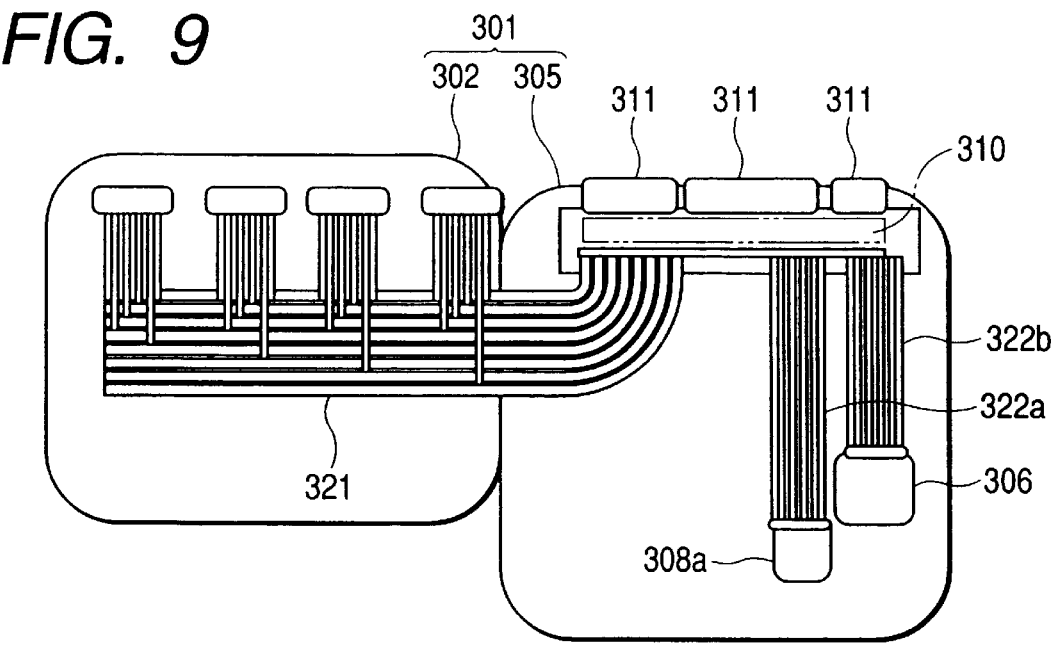
FIG. 9 is a view schematically showing the harness structure of the engine relative parts of the above.

The harness structure of the engine relative parts is, as shown in FIGS. 8 and 9, furnished with the unit case body 301 made by unifying the engine head cover part 302 and the air cleaner case part 305 and the control unit 310 (for example, EFI-ECU) for controlling the engine disposed within the air cleaner case 305 in the unit case body 301, and the circuit 321 for electrically connecting between the control unit 310 and the ignition coils 312 is disposed in the unit case body 301, such that the circuit 321 passes through at least the engine head cover 302.

The unit case body 301 is made by unifying with a resin the engine head cover 302 provided on the cylinder head of the engine main body E and the air cleaner case 305 provided on the way of a path for taking in an air into an engine combustion chamber.

In the engine head cover head part 302, ignition coils 312 are provided in correspondence to cylinders of the engine main body E for exerting a secondary high voltage generated in the ignition coils 312 to ignition plugs of respective cylinders via a path (not shown) supplying the high voltage.

The air cleaner case part 305 is composed enabling to support a filter (not shown) at the upper opening thereof, and a cover part (not shown) is provided to close the upper opening disposed with the filter. When an air introduced from an outside through an air leading path at the cover side passes through the filter, foreigners contained in the air are removed. The thus cleansed air is supplied as shown with an arrow A to the respective combustion chambers through an airflow meter 306, a throttle body 308 and an intake manifold equipped at the side of the air cleaner case part 305.

At one side in the air cleaner case part 305, a partition wall part 307 is provided for forming a space housing the control unit 310 in relation with an inside wall of the case part 305, while on the bottom of the air cleaner case part 305 in the housing space, a waterproof connector 320 is provided enabling connection with a connector of the control unit 310.

The control unit 310 has functions for controlling an ignition time by the ignition coils 312 and controlling an amount of jetting fuel by the injectors in accordance with detected signals of the throttle sensor 308a provided in the throttle body 308 or detected signals from the airflow meter 306, and the control unit 310 is disposed in the housing space partitioned by the partition wall part 307 under the condition that the connector provided to the control unit side 310 is connected to the waterproof connector 320.

From the waterproof connector 320, taken out are a circuit 321 for electrically connecting between the control unit 310 and the respective ignition coils 312 as well as circuits 322a, 322b for electrically connecting between the control unit 310, the throttle sensor 308a and the airflow meter 306, passing through the lower end of the partition wall part 307 and the bottom of the air cleaner case part 305. Namely, of the circuits connecting the control unit 310 and the external electrical equipment, the circuit supplying a primary voltage to the respective ignition coils 312 as well as the circuit controlling ON and OFF for causing the primary voltage to intermit are connected to the circuit 321 through the waterproof connector 320, while the circuits for receiving the detected signals of the throttle sensor 308a or the detected signals from the airflow meter 306 are connected to the circuits 322a, 322b via the waterproof connector 320.

As the connecting circuit 321 is composed of a flexible flat wiring board (FFC), a portion from the water proof connector 320 to the engine head cover part 302 is arranged along the bottom and the side in the air cleaner case 305, and another portion reaching the respective ignition coils 312 in the engine head cover 302 is fixed as one body along the inside of the engine head cover 302, and the connecting circuit 321 is diverged at the engine cover part 302 and electrically connected to the respective ignition coils 312. As the fixing practice referred to herein, for example, such an embodiment may be listed up which bonds the connecting circuit 321 composed of FFC to the inside of the engine head cover 302 via a bonding agent. It is also sufficient to employ the connecting circuit 321 arranged in parallel with a plurality of bus bars or single core wires in place of FFC, and bury it within the engine head cover through a procedure such as mold forming (insert forming). In the connecting circuit 321, the portion which is arranged along the bottom and the side in the air cleaner case 305 may be desirably bonded with the bonding agent or buried as one body therealong.

The connecting circuits 322a, 322b are buried along the bottom of the engine head cover 302 and electrically connected to the throttle sensor 308a and the airflow sensor 306.

In this embodiment, the connection between the control unit 310 and the electrical equipment such as the injectors is provided through the harness connected to the other connector 311 (schematically shown only in FIG. 9) appropriately furnished in the control unit 310.

According to the above composed harness structure of the engine relative parts, the unit case body 301 is furnished which is made by unifying the air cleaner case part 305 and the engine head cover part 302, the control unit 310 for controlling the engine is disposed within the air cleaner case part 305, and the circuit 321 is installed as one body in the engine head cover 302 for electrically connecting between the control unit 310 and the ignition coils 312 disposed in the engine head cover 302, and therefore, by only assembling the unit case body 301, it is possible to assemble the engine head cover 302, the air cleaner part 303, and the connecting circuit 321, and to omit the harness for electrically connecting between the ignition coils and the control unit, and to save the set-up working of the harness. As a result, it is possible to improve a set up workability of the engine relative parts and reduce weight and lower cost.

In this embodiment, it is possible to omit the harness for electrically connecting between the control unit 310, the throttle sensor 308a and the airflow meter 306, and for the same reason as above mentioned, it is possible to improve a set up workability of the engine relative parts and reduce weight and lower cost.

As the control unit 310 is disposed in the engine room, it is possible to shorten the length of the harness for connecting the control unit 310 and the electrical equipment of the car body side, reduce weight, lower cost, and to no longer require the grommet 109 shown in FIG. 4, and thus the setting work to the car body can be simplified.

The connecting circuit 321 is taken out from the waterproof connector 320 connecting the control unit 310, and can be directly connected to the respective ignition coils 312, so that it is possible to reduce the number of connecting parts between the control unit 310 and the ignition coils 312 and heighten reliability of the electric connection.

Further, the connecting circuit 321 is provided within the engine head cover 302, so that an outward appearance about the engine part is improved, and the circuit 321 is less likely to be damaged, thereby in this regard, to heighten reliability of the electric connection.

(Sixth Embodiment)

Figure 11:
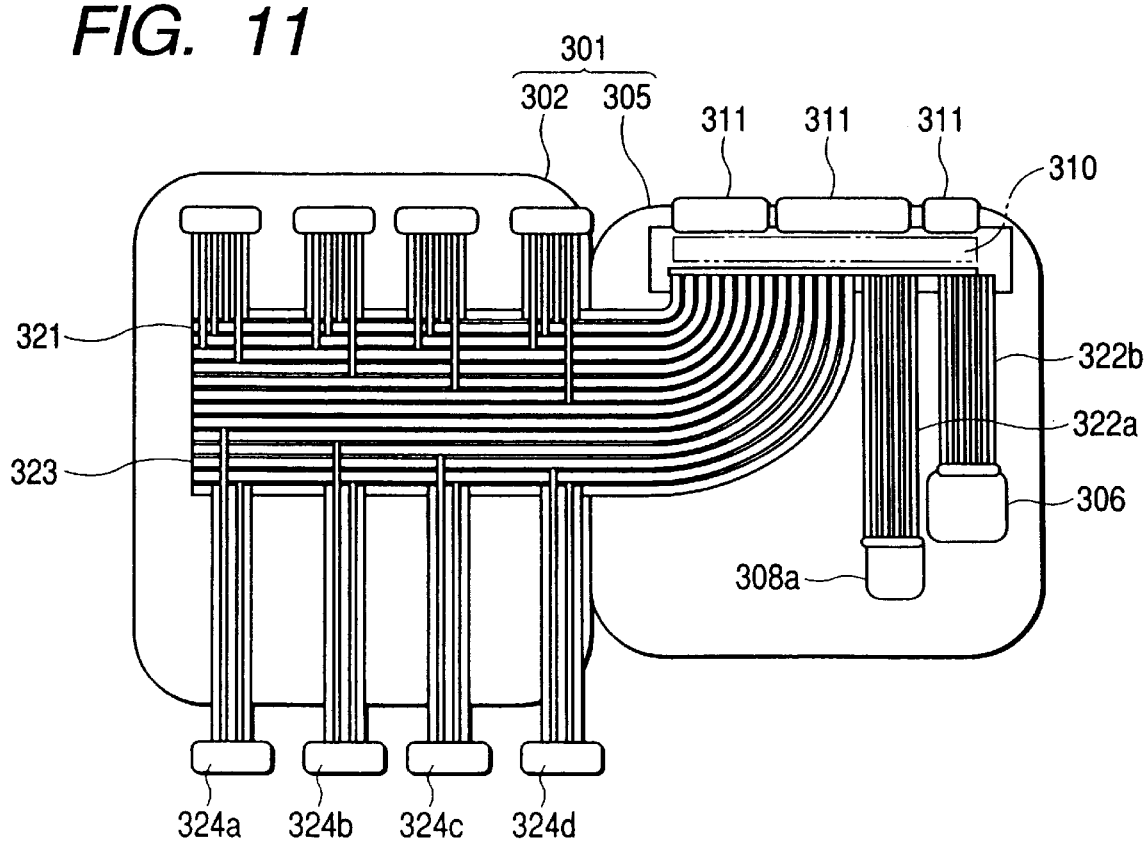
FIG. 11 is a view schematically showing the harness structure of the engine relative parts of the above.
Figure 10:
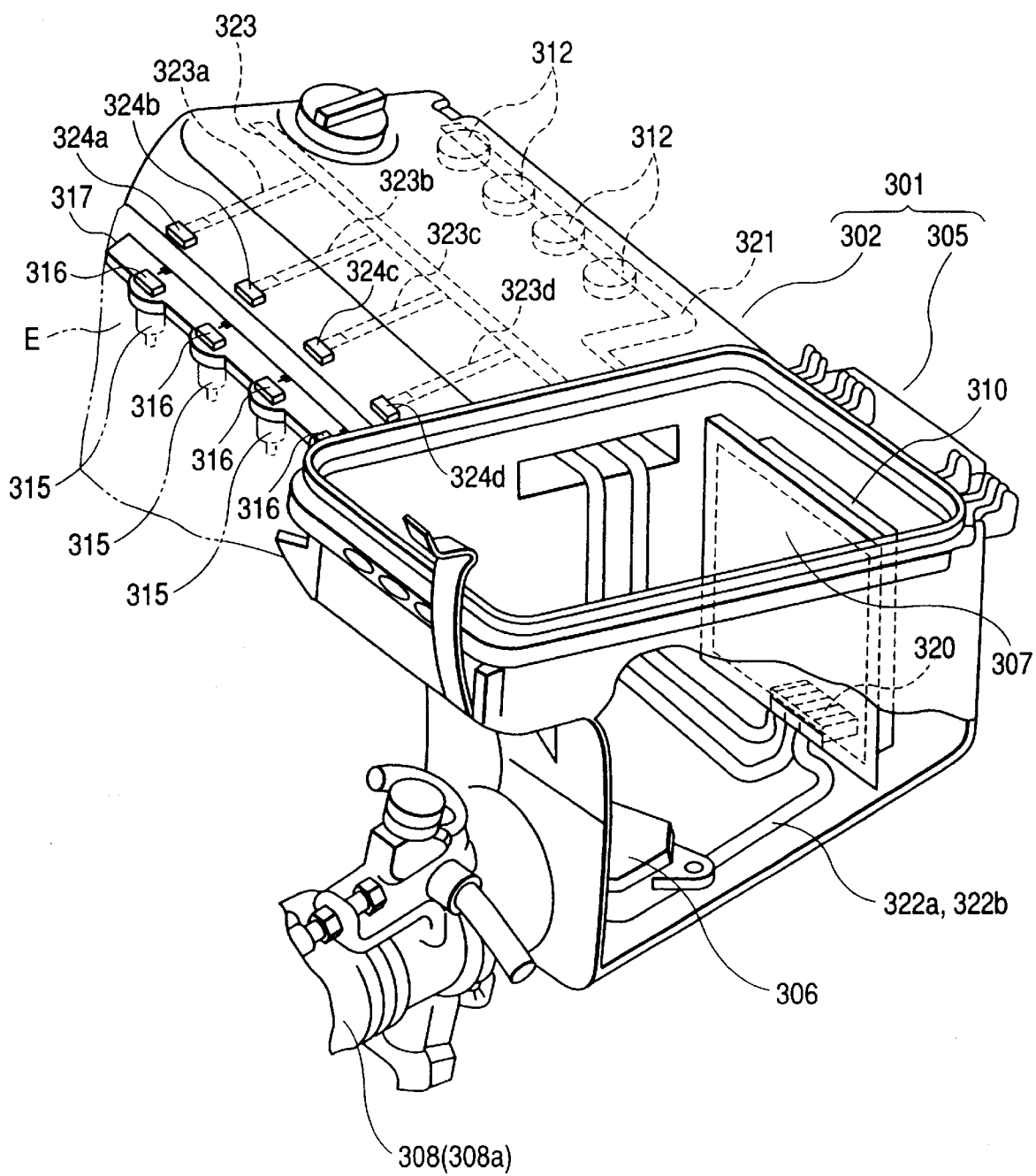
FIG. 10 is a perspective view, partially in section, showing the harness structure of the engine relative parts according to the sixth embodiment of the invention.

Next, explanation will be made to a harness structure of the engine relative parts according to a sixth embodiment of the invention, referring to FIGS. 10 and 11. In the following explanation, in regard to the same composing elements as those of the harness structure according to the first embodiment, the same reference numerals and signs will be given to omit explanation thereof.

In the present harness structure of the engine relative parts, in addition to the fifth embodiment, a circuit 323 for electrically connecting between the control unit 310 and the respective injectors 315 is installed in the unit case body 301 such that it passes through at least engine head cover 302.

Namely, at the side of the engine main body E, an injector integrated unit 317 is equipped. Each of the injectors 315 directlyjet a fuel to an intake manifold or a cylinder in correspondence to each of the combustion chambers. At the upper part of the injector integrated unit 317, four connectors 316 are provided for connecting circuits controlling the jetting amount of the respective injectors 315 from the control unit 310.

From the waterproof connector 320 in the air cleaner 305, taken out is a circuit 323 for electrically connecting between the control unit 310 and the respective injectors 315, passing through the lower end of the partition wall part 307 and the bottom of the air cleaner case part 305. Namely, of the circuits connecting the control unit 310 and the external electrical equipment, a circuit for controlling the jetting amount of the respective injectors 315 is connected to the circuit 323 via the waterproof connector 320.

The connecting circuit 323 is, as is the above mentioned connecting circuit 321, composed of the flexible flat wiring board (FFC), and a portion from the water proof connector 320 to the engine head cover part 302 is buried along the bottom and the side in the air cleaner case 305, and the other portion is fixed as one body along the inside of the engine head cover 302, and the connecting circuit 323 is diverged into four in response to the respective injectors 315 at the engine cover part 302. The diverged connecting circuits 323a to 323d are somewhat projected to the outside from the side of the engine head cover 302, and at these projected ends, connectors 324a to 324d are attached, thereby enabling connection to the respective connectors 316, so that electric connections are composed between the control unit 10 and the respective injectors 315. It is also sufficient to employ the connecting circuit 323 arranged in parallel with a plurality of bus bars or single core wires instead of FFC, and bury it within the engine head cover. In this case, it is desirable to prepare the molding form for covering with resin the projecting parts from the engine head cover. In the connecting circuit 323, the portion which is arranged along the bottom and the side in the air cleaner case 305 may be desirably bonded with the bonding agent or buried as one body therealong.

According to the harness structure of the engine relative parts in the sixth embodiment composed as mentioned above, in addition to the fifth embodiment, the circuit 323 for electrically connecting between the control unit 310 and the respective injectors 315 is installed in the engine head cover 302, thereby enabling to omit the harness connecting the respective injectors 315 and the control unit 310 and cancel the troublesome assembling work, and as a result, it is possible to improve a setting-up workability of the engine relative parts, reduce weight and lower cost.

Further, the connecting circuit 323 is provided within the engine head cover 302, so that an outward appearance about the engine part is improved, and the circuit 323 is difficult to be damaged, thereby heightening reliability of the electric connection.

In the sixth embodiment, the injector integrated unit 317 may be formed integrally with the engine head cover 302. Within such an integrally formed unit, the connecting circuit 323 can be connected to the respective injectors 315.
(Modified Example)

In the sixth embodiment, the explanation has been made to the structure where both circuits 321, 323 connecting between the control unit 310, the ignition coils 312 and the injectors 315 are installed as one body in the engine head cover 302, but the only circuit connecting between the control unit 310 and the injectors 315 may be installed within the engine head cover. Further, in case the electric equipment is furnished in the engine head cover itself or in the neighborhood thereof, the circuit connecting between the electrical equipment and the control unit 310 may be arranged within the engine head cover 302.
[Effects of the Invention]

According to the harness structure of the engine relative parts of the seventh to eleventh aspects of the invention, the unit case is made by unifying the engine head cover in the air cleaner case, the control unit for controlling the engine is disposed in the air cleaner case. The circuit for electrically connecting between the control unit and the electrical equipment arranged in the engine head cover itself or in the neighborhood thereof, is provided such that the circuit passed through at least the engine head cover, thereby enabling omission of the harness between the electrical equipment and the control unit and cancellation of the troublesome assembling work, and as a result it is possible to improve a set up workability of the engine relative parts, reduce weight and lower cost.

As the eleventh aspect of the invention, in case the airflow meter and the throttle sensor are disposed in the air cleaner case, and the circuits electrically connecting between the control unit, the airflow meter and the throttle sensor are provided as one body in the air cleaner, it is possible to omit the harness between the airflow meter and the throttle sensor and the control unit, and to cancel the troublesome assembling work, and as a result it is possible to improve a set up workability of the engine relative parts, reduce weight and lower cost.
[Mode for Carrying out the Invention]
(Seventh Embodiment)

Figure 12:
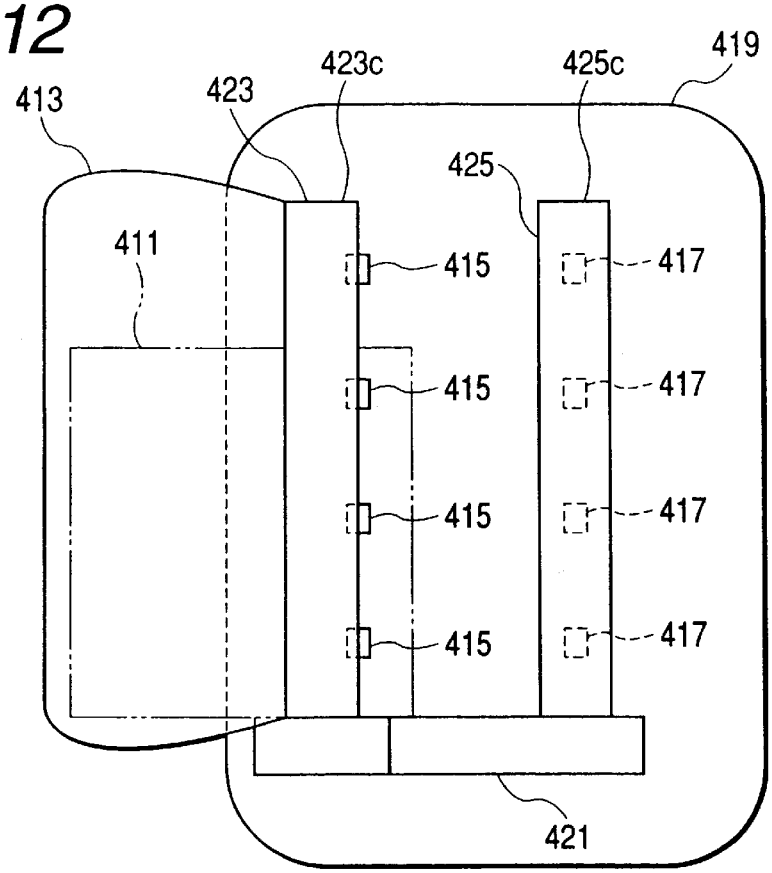
FIG. 12 is a plane view showing the harness structure of the engine relative parts according to a seventh embodiment of the invention.
Figure 13:
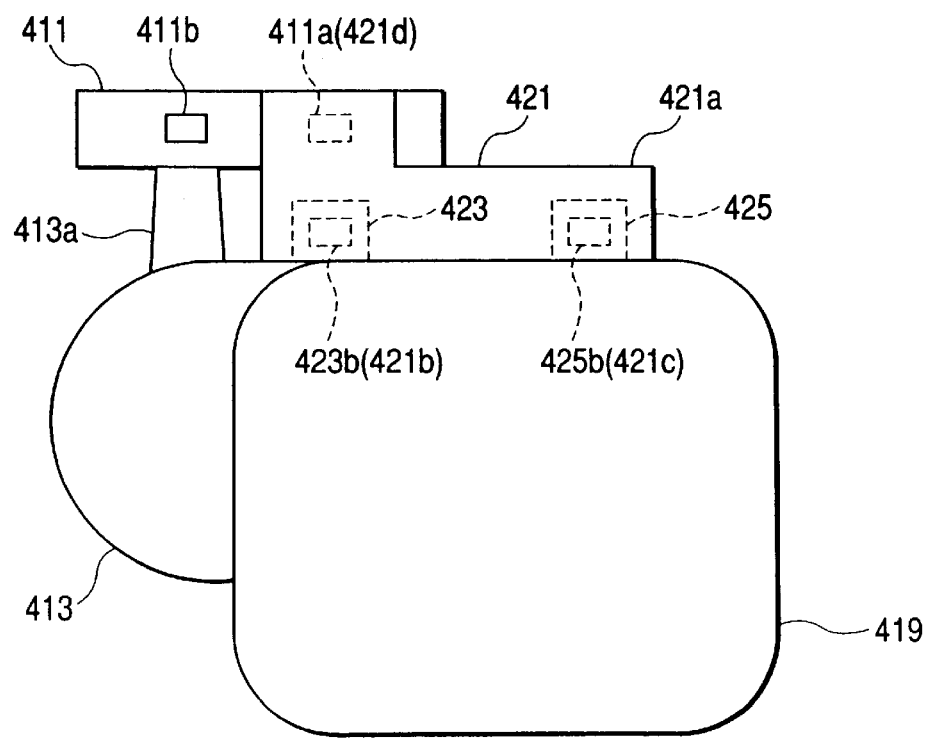
FIG. 13 is a side view of the harness structure of FIG. 12.
Figure 14:
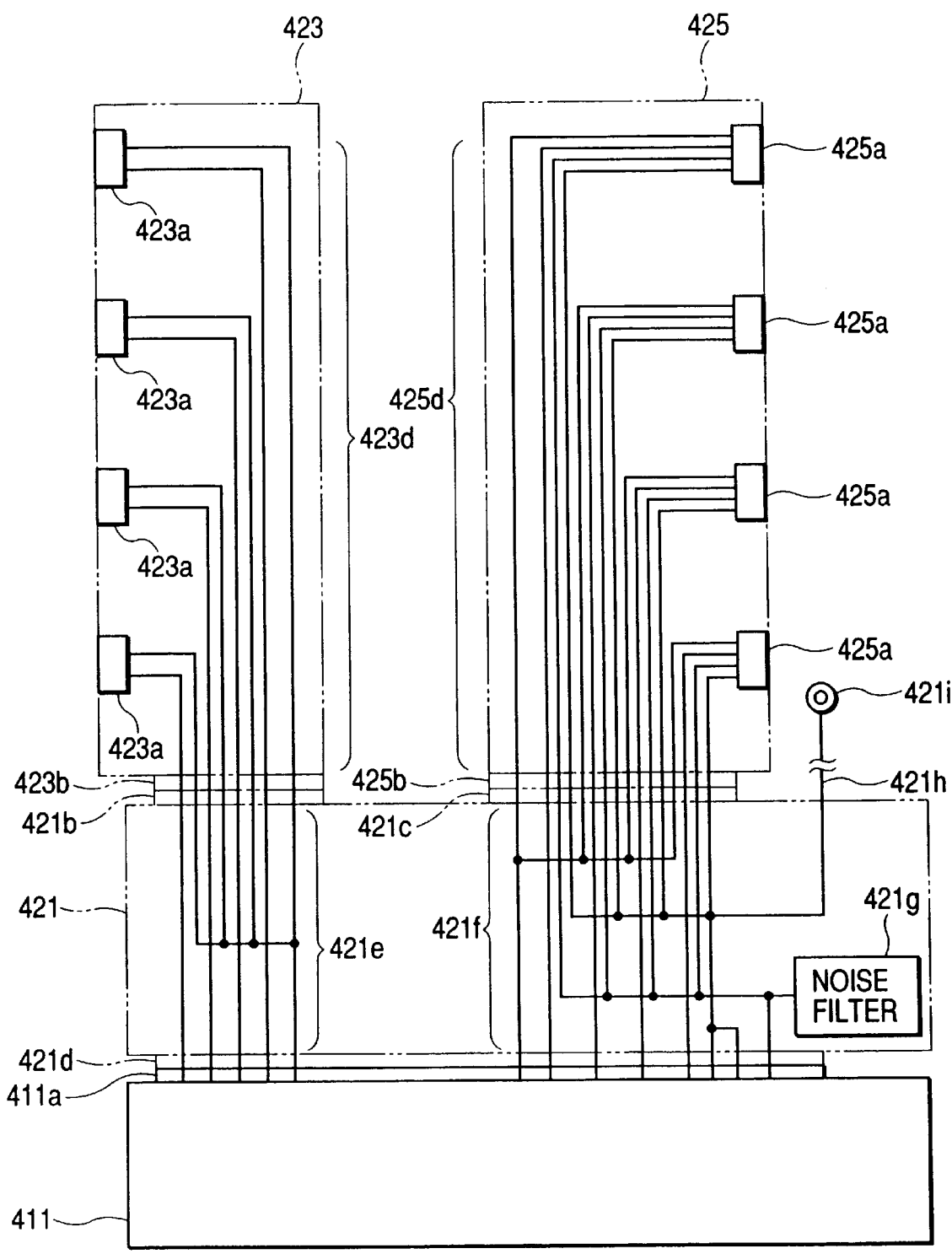
FIG. 14 is a view of circuits of the harness structure of FIG. 12.

FIG. 12 is a plane view showing the harness structure of the engine relative parts according to a seventh embodiment of the invention, FIG. 13 is a side view of the harness structure of FIG. 12, and FIG. 14 is a view of circuits of the harness structure of FIG. 12.

In the harness structure of the engine relative parts relating to the present embodiment, as shown in FIGS. 12 and 13, a control unit 411 for controlling the engine is installed in an intake manifold 413. Herein, the engine control unit 411 controls the electrical equipment of the engine relative parts (in the instant embodiment, the injector 415, the ignition coil 417 and others) in accordance with an electric source and control signals to be given, and it is fixed to a supporter 413a provided in the intake manifold 413 by a desired fixing instrument (not shown) (for example, bolt fixing, interlocking structure or bond agent fixing). The engine is shown with reference numeral 419 in FIGS. 12 and 13.

The engine control unit 411 is, as shown in FIGS. 13 and 14, provided with the connector 411a which corresponds to a first connector of the invention and is connected to a later mentioned connecting box 421 (trunk connecting part). Further, in the control unit 411, another connector 411b is furnished for supplying the electric source or inputting control signals. FIG. 14 omits the connector 411b for convenience.

Figure 15:
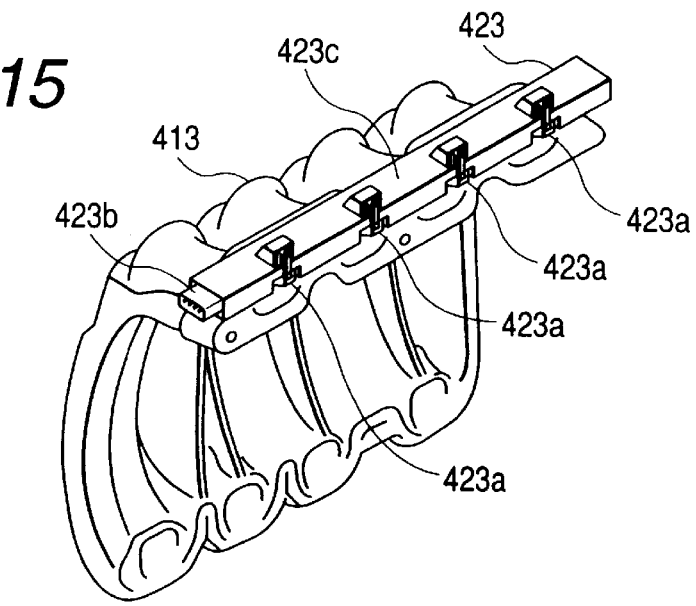
FIG. 15 is a perspective view showing the composition of the intake manifold to be furnished to the harness structure of FIG. 12.
Figure 16:
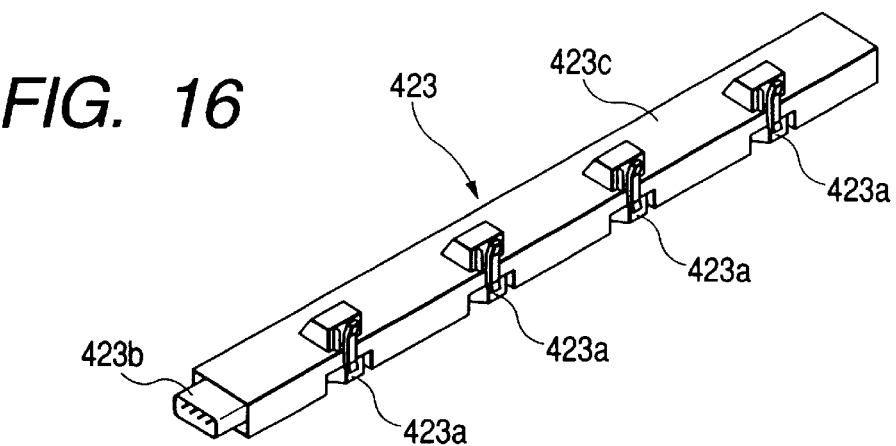
FIG. 16 is a perspective view of the injector wiring part to be fixed to the intake manifold of FIG. 15.

As seen in FIGS. 12 and 15, the intake manifold 413 is integrally provided on the upper part thereof with a wiring part 423 for connecting the injectors. The wiring part 423 is served to connect the respective injectors 415 to the control unit 411 via the connecting box 421, and has a long shape enabling to connect a plurality of injectors 415 (four pieces herein) as shown in FIG. 16.

Figure 17:
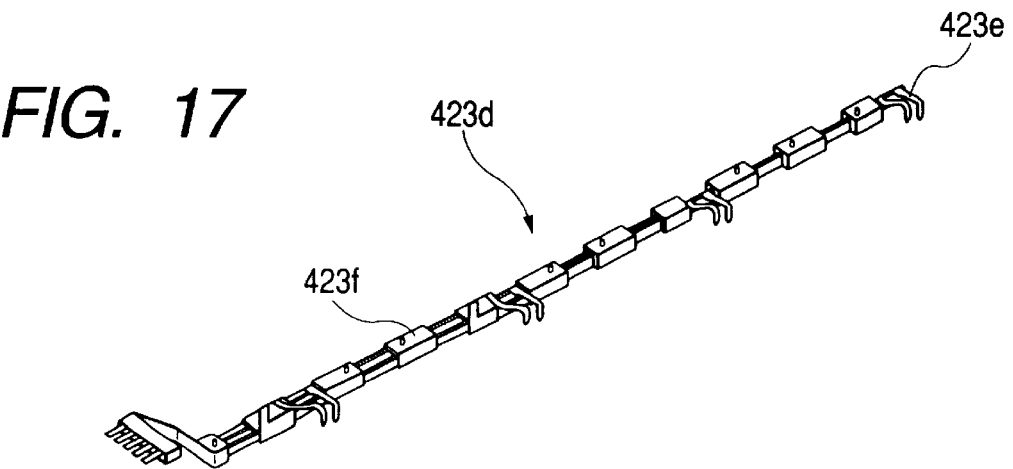
FIG. 17 is a perspective view showing the circuit parts to be provided within the wiring parts for connecting the injector of FIG. 16.
Figure 18:
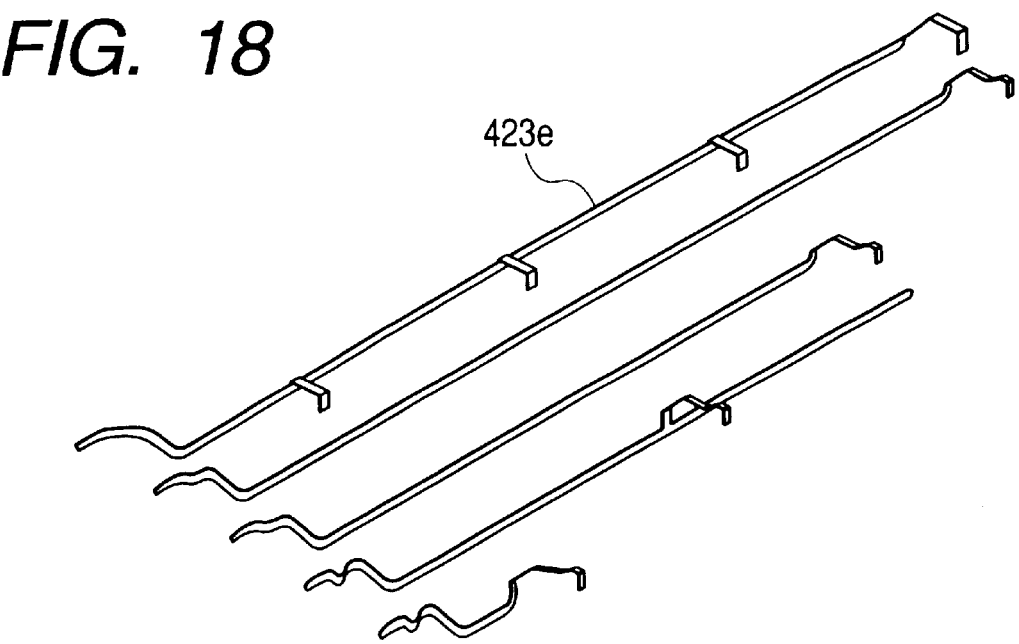
FIG. 18 is perspective views of the bus bars for composing the circuit parts of FIG. 17.

The wiring part 423 is provided at the lower side with a plurality (four pieces herein) of connectors 423a (fifth connector) for connecting the injectors, and is provided at one end portion with connectors 423b (fourth connector) for connecting the connecting box 421. Within a casing body 423c, there is supported a circuit part (second circuit portion) 423d as shown in FIG. 17 for connecting the connector 423b and the respective connectors 423a. In the present embodiment, the circuit part 423d is, as shown in FIG. 18, composed by uniting bus bars 423e with resin-made holding members 423f as keeping an insulating condition, otherwise the circuit part 423d may be composed with a plurality of single core conducting wires or flat cables.

Such a composed wire part 423 is fixed to the upper part of the intake manifold 413 by a desired fixing instrument (not shown) (for example, bolt fixing, interlocking structure or bond agent fixing).

As seen in FIGS. 12 and 13, the engine 419 is integrally provided on the upper part thereof (for example, an engine head cover) with a wiring part 425 for connecting the ignition coil. The wiring part 425 is served to connect the respective ignition coils 417 to the engine control unit 411 via the connecting box 421, and has a long shape enabling to connect a plurality of injectors 415 (four pieces herein) as shown in FIG. 12.

The wiring part 423 is provided at the lower side with a plurality (four pieces herein) of connectors 425a (see FIG. 14) for connecting the ignition coils, and is provided at one end portion with a connector 425b for connecting the box 421. Within a casing body 425c, there is supported a circuit part 425d (see FIG. 14) for connecting the connector 425b and the respective connectors 425a (see FIG. 14). The structure of this circuit part 425d is substantially the same as that of the circuit part 423d.

Such a composed wire part 425 is fixed to the upper part of the intake manifold 413 by a desired fixing instrument (not shown) (for example, bolt fixing, interlocking structure or bond agent fixing).

The connectors 411a, 411b of the engine control unit 411 and the connectors 423b, 425b of the wiring parts 423, 425 are located to direct in the same direction (in the present embodiment, these connectors face down to the lower side in FIG. 12) under the condition that the control unit 411 and the wiring parts 423, 425 are furnished to the intake manifold 413 and the engine 419). The connector 411a of the control unit 411 and the connectors 423b, 425b of the wiring parts 423, 425 are electrically connected through the connecting box 421.

The connecting box 421 is, as seen in FIG. 13, shaped in almost an L as a whole, and provided on the outer peripheral surface with connectors 421b, 421c, 421d which are electrically mounted to the connectors 423b, 425b, 411a. Herein, to second and third connectors of the invention, the connector 421d and the connector 421b correspond respectively.

Within the casing body 421a, there is a circuit portion (a first circuit portion) 421c connecting between the connectors 421b and 421d as well as a circuit portion (a third circuit portion) 421f connecting between the connectors 421c and 421d, and a noise filter 421g for canceling noises when operating the ignition coil 417. In this embodiment, the noise filter 421g may be located within the casing body 421a, but such a structure is also sufficient that the noise filter 421g may be inserted via an insertion hole provided on an outer peripheral part of the casing body 421a to locate it therein. The circuit portions 421e, 421f are composed of plural bus bars or single core conducting wires.

From the connecting box 421, an earth wire 421h is lead for grounding the engine 419, and has at its front end part a terminal 421i for connecting to the engine 419.

In this embodiment, the fixing of the connecting box 421 does not depend on direct fixing to the intake manifold 413 or the engine 419, but depends on mutual mountings between the respective connectors 411a, 423b, 425b, 421d, 421b, 421c, so that the connecting box 421 is fixed to the intake manifold 413 and the engine 419 via the engine control unit 419 and the wiring parts 423, 425.

Figure 19:
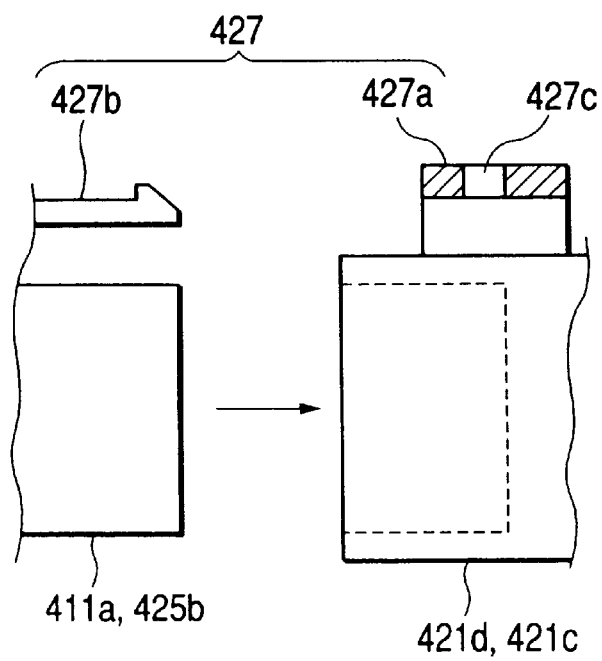
FIG. 19 is side views, partially in section, showing the locking structure to be equipped to the wiring parts for connecting the connecting box, the engine control unit and the ignition coil.

In response to the above practice, for locking the control unit 411 and the connectors 411a, 425b of the wiring part 425 as well as the connectors 421d, 421c of the connecting box 421 to be mounted to the connectors 411a, 425b, a locking structure 427 is equipped as shown in FIG. 19, for locking as the connectors 411a, 425b, 421d, 421d are respectively mounted. Incidentally, the connectors 421b, 423b may be provided with a similar locking structure.

The locking structure 427 has, as shown in FIG. 19, an engaging part 427a integrally formed in the connectors 421d, 421c and an engaging pawl 427b integrally formed in the connectors 411a, 425b. The engaging part 427a is formed with an engaging recess part (herein, an engaging hole) 427c for engaging the engaging pawl 427b.

Being accompanied with the mutual connections of the connectors 411a–425b and 421d–421c, the pawl portion at the front end of the engaging pawl 427b enters until the position of the engaging recess 427c as the pawl portion gets over the outer peripheral part of the engaging recess 427c, and engages the engaging recess 427c and is locked in such a manner that the connectors 411a–425b and 421d–421c are mounted. The connecting box 421 is thereby unitarily fixed to the intake manifold 413 and the engine 419 via the engine control unit 411 and the wiring parts 423, 425. The reason for including not only the wiring part 425 but also the wiring part 423 not provided with the locking structure 427 as members contributing to the fixing of the connecting box 421, is because a holding force generated when the connectors 421b, 423b are mounted, also contributes to the fixing of the connecting box 421.

As mentioned above, according to the present embodiment, the engine controlling unit 411 is placed at the intake manifold 413, while the wiring parts 423, 425 and the connecting box 421 for connecting between the engine control unit 411 as well as the injector 415 and the ignition coil 417 are arranged as one body to the intake manifold 413 or the engine 419, so that it is possible to omit the harness as the prior art having the long length and the heavy weight for electrically connecting between the control unit and the injector, and to save the set-up working of the harness. As a result, it is possible to improve set up workability of the engine relative parts and reduce weight and lower cost.

As the engine control unit 411 is disposed to the intake manifold 413, it is possible to shorten the length of the harness for connecting the control unit 411 and the electrical equipment of the car body side, reduce weight, lower cost, and to no longer require the grommet 109 shown in FIG. 4, and thus the setting work to the car body can be simplified.

The electric connection passing through the engine control unit 411, the connecting box 421, the wiring parts 423, 425, the injectors 415 and the ignition coils 417 is easily accomplished by the connector connection.

The mounting connections between the connectors 411a–425b, and the connectors 421d–421c are locked by means of the locking structure 427, whereby the connecting box 421 is unitarily fixed to the intake manifold 413 and the engine 419 via the engine control unit 411 and the wiring parts 423, 425, so that any special setting work of the connecting box 421 to the intake manifold 413 and the engine 419 is not required other than the mounting works of the connectors 411a, 401b to 421d, 423b, 425b. Thus, the workability is good.

In this embodiment, the wiring part 423 is formed separately from the intake manifold 413, and subsequently is secured to the intake manifold 413, but it may be sufficient to form at least one part (an upper end) of the intake manifold 413 with a resin at which the wiring part 423 is formed. In this case, it is preferable that the circuit portion 423d is formed with the plural bus bars or the single core wires, so that the circuit portion is buried by a mold forming within the resin-made part of the intake manifold 413.

In the above mentioned embodiment, not equipping the lock structure 427, it is also sufficient to secure the connecting box 421 to the intake manifold 413 or the engine 419 by means of a securing bolt.

[Effects of the Invention]

According to the twelfth to seventeenth aspects of the invention, since the engine controlling unit is disposed to the intake manifold, and at the same time the intake manifold itself, or the circuit for electrically connecting between the electrical equipment in the neighborhood of the intake manifold and the engine control unit is integrally furnished in the intake manifold, the harness to be located between the electrical equipment and the engine control unit may be omitted, and no troublesome set-up work therefor may be required, and as a result, it is possible to improve set up workability of the engine relative parts and reduce weight and lower cost.

According to the thirteenth aspect of the invention, the electric connection is easily made by the connector connection among the engine control unit, the trunk connecting part, the injector, and the wiring part for connecting the injectors.

According to the fourteenth aspect of the invention, similarly to the first and second connectors, the mounting connections between the third and the fourth connectors are locked by means of the locking structure, and since the trunk connecting parts are integrally connected to the intake manifold via the engine control unit and the wiring parts for connecting the injectors, so that any special setting work to the intake manifold is not required other than the mounting works of the connectors. Thus, the workability is good.

According to the seventeenth aspect of the invention, the trunk connection can be applied to the connection between the engine control unit and the ignition coil, thereby enabling omission of at least one part of the conventional harness between the engine control unit and the ignition coil.

What is claimed is:

1. A harness structure of engine relative parts comprising:
   a unit for controlling an engine disposed in an air cleaner installed around said engine; and
   circuits for electrically connecting said engine control unit to other electrical devices provided in said air cleaner itself or in a neighborhood thereof, disposed as one body in a casing body of said air cleaner wherein said electrical devices include at least one of an airflow meter and a throttle sensor.

2. The harness structure of engine relative parts as set forth in claim 1, wherein
   said connecting circuits comprise bus bars or single core leading wires, and are formed as one body in said casing body.

3. The harness structure of engine relative parts as set forth in claim 1, wherein
   said connecting circuits comprise a flat cable, and are fixed as one body following an inside face of said casing body.

4. A harness structure of engine relative parts comprising:
   a modularized wire harness of an engine system connected to an ignition system such as ignition coils and injectors, to an emission system such as a warm water sensor and O$_2$ sensor, as well as to an engine control computer, wherein
   said engine control computer is furnished to an engine side,
   said wire harness of said engine system separately providing electrical connection to a harness form of said ignition system to be connected to said ignition system and a harness form of said emission system to be connected to said emission system.

5. The harness structure of engine relative parts as set forth in claim 4, wherein
   said wire harness of said engine system separately provides electric power.

6. A harness structure of engine relative parts comprising:
   a unit case body is made by unifying an engine head cover with an air cleaner case and a control unit for controlling an engine disposed as one body within said air cleaner case;
   a connecting circuit disposed within said unit case body, such that said connecting circuit passes through at least said engine head cover, said circuit electrically connecting said control unit to said engine head cover itself or to other electrical devices, wherein an airflow meter and a throttle sensor are disposed in said air cleaner case, and said circuit electrically connects said control unit to said airflow meter and said throttle sensor, and is disposed as one body in said air cleaner.

7. The harness structure of engine relative parts as set forth in claim 6, wherein
   said connecting circuit comprises bus bars or single core leading wires, and is formed as one body in said engine head cover.

8. The harness structure of engine relative parts as set forth in claim 6, wherein
   said connecting circuit comprises a flat cable, and is fixed to the inside surface of said engine head cover.

9. The harness structure of engine relative parts as set forth in claim 6, wherein said electrical devices are at least one of ignition coils or injectors.

10. A harness structure of engine relative parts comprising:
    a control unit for controlling an engine disposed on an intake manifold,
    connecting circuits for making an electric connection between electrical devices disposed in a neighborhood of said intake manifold and said engine control unit are integrally furnished with said intake manifold wherein said electrical devices include at least injectors;
    said connecting circuits are connected each other and furnished with a first circuit portion and a second circuit portion;
    said first circuit portion is disposed to a trunk connecting part which is integrally attached to said intake manifold, while said second circuit portion is disposed to wiring parts for connecting said injectors which are integrally provided to said intake manifold;
    said engine control unit is furnished with a first connector for connecting said trunk connecting part;
    said trunk connecting part is equipped with second and third connectors which are electrically connected to each other through said first circuit portion, said second connector being mounted to said first connector, enabling an electric connection, and said third connector being served for electric connection with said wiring part for connecting said injectors; and
    said wiring part for connecting said injectors is equipped with a fourth and fifth connectors which are electrically connected to each other through said second circuit portion, said fourth connector being mounted to said third connector, enabling an electric connection, and said fifth connector being served for electric connection with said injectors.

11. The harness structure of engine relative parts as set forth in claim 10, wherein said engine control unit is fixedly provided to said intake manifold, with respect to said first connector and said second connector, and said third connector and said fourth connector, at least either connector couple are equipped with a locking structure for locking both connectors in such a manner that both connectors are mutually engaged together with mutual mounting thereof; and said trunk connecting part is integrally fixed to said intake manifold via said engine control unit and said wiring part for connecting said injectors together with the mounting and connecting between said first and said second connectors, and said third and said fourth connectors.

12. The harness structure of engine relative parts as set forth in claim 10, wherein said first circuit portion comprises bus bars or single core leading wires.

13. The harness structure of engine relative parts as set forth in claim 10, wherein said second circuit portion comprises said bus bars, said single core leading wires of flat cables.

14. The harness structure of engine relative parts as set forth in claim 10, wherein said trunk connecting part is provided with a sixth connector to be connected to said wiring part for connecting said ignition coil to be provided to said engine or in the neighborhood thereof, and at the same time provided with a third circuit part, and said wiring part for connecting said ignition coil is enabled to be connected with said engine control unit via said sixth connector, said third circuit part and second connector.

\* \* \* \* \*